US012759656B2

(12) United States Patent
Shenkerman et al.

(10) Patent No.: US 12,759,656 B2
(45) Date of Patent: Oct. 13, 2026

(54) BICYCLE LOCK CARRIER ASSEMBLY

(71) Applicant: Ino Vision Ltd., Herzliya (IL)

(72) Inventors: Michael Shenkerman, Rishpon (IL); Shahaf Levavi, Ramat HaSharon (IL)

(73) Assignee: Ino Vision Ltd., Herzliya (IL)

( * ) Notice: Subject to any disclaimer, the term of this patent is extended or adjusted under 35 U.S.C. 154(b) by 373 days.

(21) Appl. No.: 18/591,197

(22) Filed: Feb. 29, 2024

(65) Prior Publication Data

US 2025/0276750 A1 Sep. 4, 2025

(51) Int. Cl.
*B62H 5/00* (2006.01)

(52) U.S. Cl.
CPC .................................... *B62H 5/00* (2013.01)

(58) Field of Classification Search
CPC .............................. B62H 5/00; Y10T 70/5872
USPC ........................................................... 70/233
See application file for complete search history.

(56) References Cited

U.S. PATENT DOCUMENTS

| | | | | |
|---|---|---|---|---|
| 5,291,765 | A * | 3/1994 | Hoisington | B62J 11/00 70/49 |
| 5,408,212 | A * | 4/1995 | Meyers | E05B 45/005 340/432 |
| 5,564,297 | A * | 10/1996 | Evers | B62H 5/14 70/227 |
| 6,016,673 | A * | 1/2000 | McDaid | B62H 5/003 248/314 |
| 6,422,442 | B1 * | 7/2002 | McDaid | B62J 11/00 224/442 |
| 10,392,065 | B2 * | 8/2019 | Shenkerman | B62J 1/08 |

FOREIGN PATENT DOCUMENTS

| | | | | | |
|---|---|---|---|---|---|
| CN | 209581675 | U * | 11/2019 | B62H 5/00 |
| DE | 102013102010 | A1 * | 9/2013 | B62J 11/00 |
| DE | 202014102172 | U1 * | 8/2015 | E05B 9/00 |
| DE | 202019101823 | U1 * | 4/2019 | B62H 5/00 |
| EP | 3106376 | A1 * | 12/2016 | B62J 11/00 |
| EP | 3219592 | A1 * | 9/2017 | F16B 2/10 |
| EP | 3412545 | A1 * | 12/2018 | B62H 5/00 |
| WO | WO-2021045721 | A1 * | 3/2021 | B62J 11/00 |

* cited by examiner

*Primary Examiner* — Suzanne L Barrett
(74) *Attorney, Agent, or Firm* — AlphaPatent Associates Ltd.; Daniel J. Swirsky

(57) ABSTRACT

A bicycle lock carrier assembly includes a bicycle lock carrier including a resting surface that includes a lock receiving member and one or more mounting provisions for securing to a frame of a bicycle, and a bicycle lock including a lock that fits inside the lock receiving member. The lock includes a lock member that is arranged to engage a locking structure of a portion of the bicycle lock which is outside the lock receiving member when the bicycle lock is placed on the resting surface, so as to lock the bicycle lock to the lock receiving member of the bicycle lock carrier.

9 Claims, 5 Drawing Sheets

BICYCLE LOCK CARRIER ASSEMBLY

FIELD OF THE INVENTION

This invention relates generally to bicycle locks, and particularly to a carrier for a bicycle lock, such as a folding lock, which is lockable to the carrier.

BACKGROUND OF THE INVENTION

Folding locks, for locking bicycles to a post or other object, are made up of a series of metal bars (flat plate bar links), which are linked together by joints, typically rivets. The rivets allow the bar links to rotate so they can be folded into a compact configuration for storage on the bicycle and folded out for fastening the bicycle to the object.

Folding locks are normally stored on a carrier, which is typically secured to a portion of the bicycle frame. It is not known in the prior art to lock the folding lock to the carrier itself.

SUMMARY

The present invention seeks to provide an improved carrier for a bicycle lock, particularly, a folding lock. The carrier of the invention may be used for bicycles and other items, such as but not limited to, strollers, carriages and the like, as is described in detail further hereinbelow. The terms “folding lock” or “bicycle lock” or “folding bicycle lock” are used to encompass a lock for bicycles and these other items. Unlike the prior art, the bicycle lock carrier of the invention enables the folding lock to be locked to the carrier, which among other things, prevents theft of the folding lock from the bicycle.

There is thus provided in accordance with a non-limiting embodiment of the invention a bicycle lock carrier assembly including a bicycle lock carrier including a resting surface that includes a lock receiving member and one or more mounting provisions for securing to a frame of a bicycle, and a bicycle lock including a lock that fits inside the lock receiving member, the lock including a lock member that is arranged to engage a locking structure of a portion of the bicycle lock which is outside the lock receiving member when the bicycle lock is placed on the resting surface, so as to lock the bicycle lock to the lock receiving member of the bicycle lock carrier.

In accordance with a non-limiting embodiment of the invention, the bicycle lock includes a folding bicycle lock that includes a plurality of link members which are pivotally connected to one another by joint members, and the locking structure of the portion of the bicycle lock is located on a lockable link member, which is one of the link members.

There is thus provided in accordance with a non-limiting embodiment of the invention a bicycle lock carrier assembly including a bicycle lock carrier including a resting surface that includes a lock receiving member and one or more mounting provisions for securing to a frame of a bicycle, and a bicycle lock including a lock that fits inside the lock receiving member, wherein the bicycle lock has a configuration in which the bicycle lock is locked to the bicycle lock carrier and blocks access to the one or more mounting provisions.

BRIEF DESCRIPTION OF DRAWINGS

The present invention will be understood and appreciated more fully from the following detailed description, taken in conjunction with the drawings in which.

DETAILED DESCRIPTION

Figure 1:
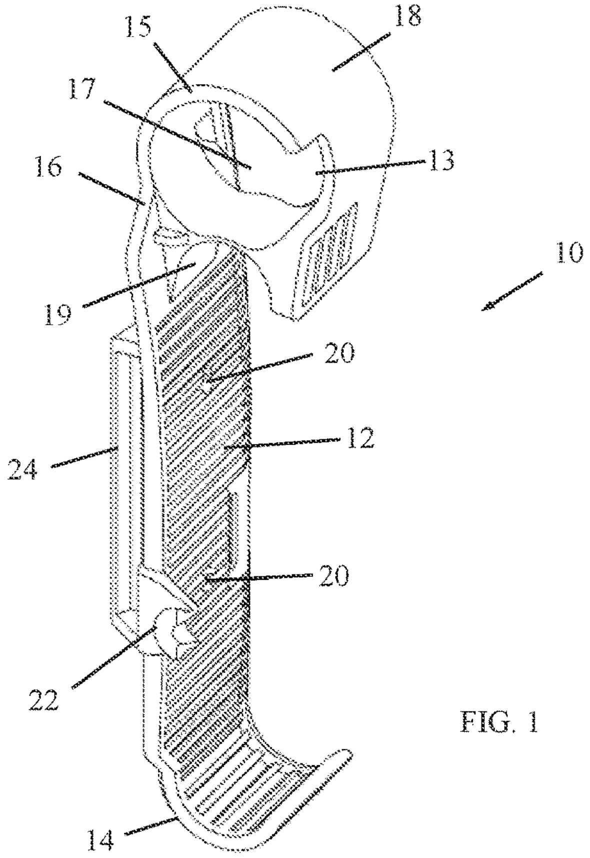
FIG. 1 is a simplified perspective illustration of a bicycle lock carrier, in accordance with a non-limiting embodiment of the present invention.
Figure 2:
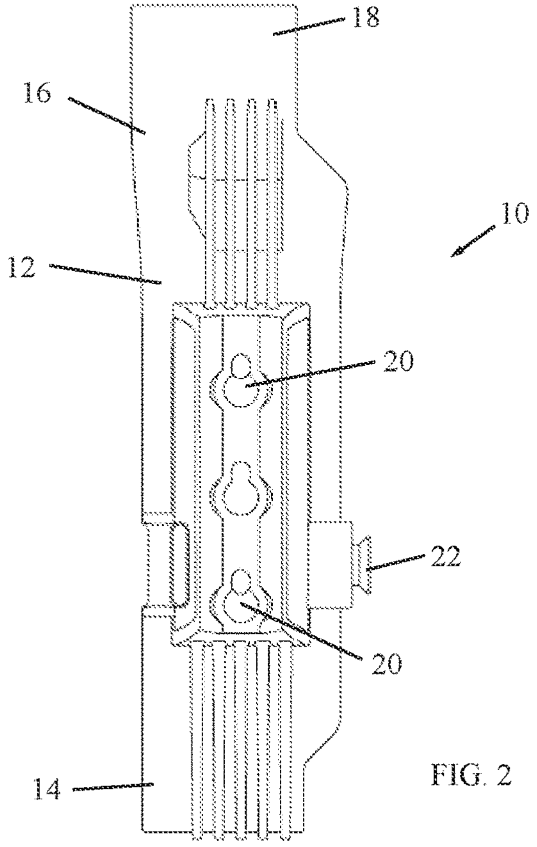
FIGS. 2, 3, 4, 5, and 6 are simplified rear view, top view, bottom view, left side view, and right side view illustrations, respectively, of the bicycle lock carrier.
Figure 3:
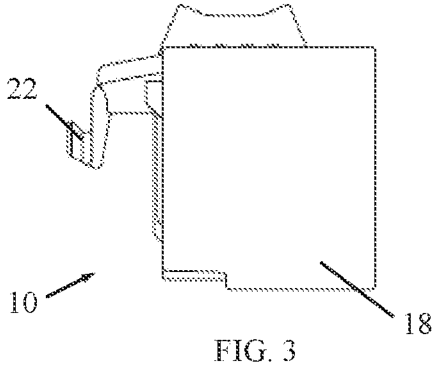
Figure 4:
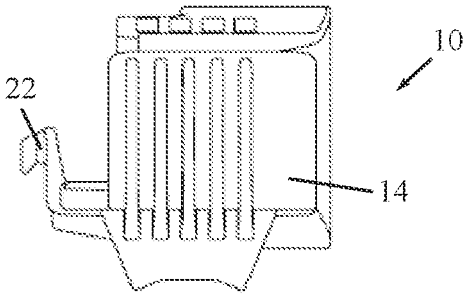
Figure 5:
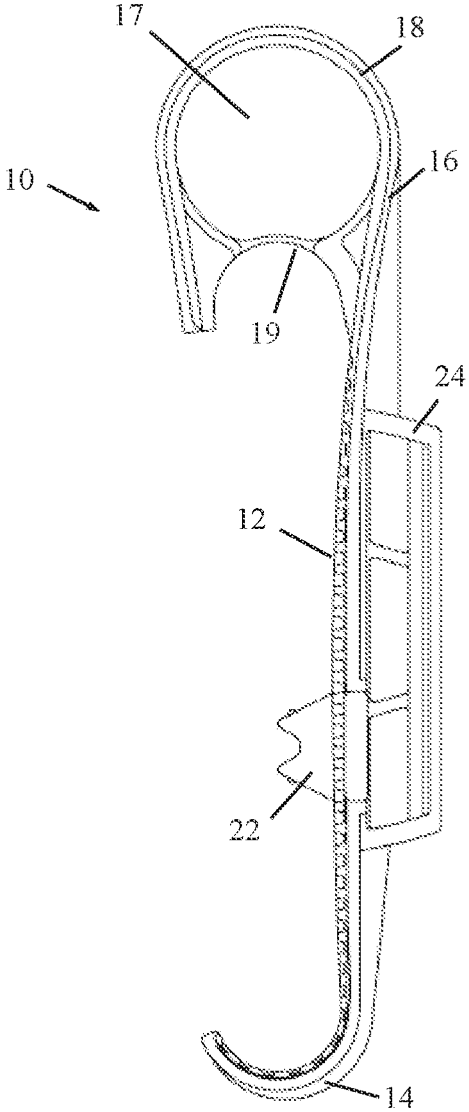
Figure 6:
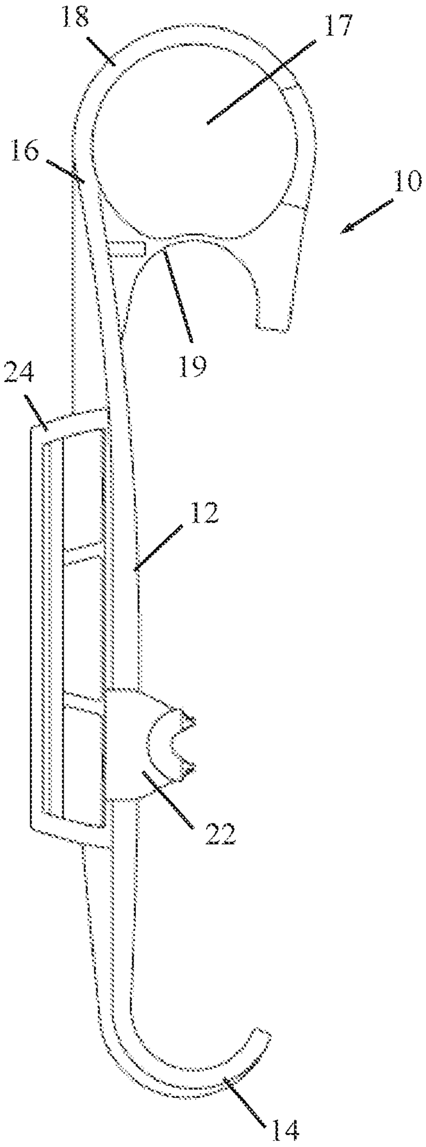

Reference is now made particularly to FIG. 1, as well as to FIGS. 2-6, which illustrate a bicycle lock carrier 10, in accordance with a non-limiting embodiment of the present invention.

The bicycle lock carrier 10 includes a resting surface 12, a first end 14 of which may be curved upward (in the sense of the drawings) and a second end 16 of which may include a lock receiving member 18. In the non-limiting illustrated embodiment, the resting surface 12 may be rectangular, but other shapes are within the scope of the invention. Resting surface 12 may be smooth or have any other kind of texture, such as being formed with parallel ridges, knurling and other textures. Resting surface 12 may be formed with one or more mounting provisions 20, such as holes for passing therethrough fasteners (such as screws) for securing the bicycle lock carrier 10 to a portion of a bicycle frame.

The first end 14 may be curved to correspond to the curvature of link members of a folding bicycle lock, as will be described below.

The lock receiving member 18 may be a cylindrical member with an inner, hollow, circular chamber 17 in which the user can place the lock of the folding bicycle lock, as will be described below. The lock receiving member 18 may include an outer curved abutment 19 that couples to resting surface 12. The outer curved abutment 19 may be curved to correspond to the curvature of the link members of the folding bicycle lock, as will be described below. The lock receiving member 18 may have a recess 13 formed at an end 15 thereof. The recess 13 may be shaped to allow passage of a locking structure (of one of the link members of the folding bicycle lock) into inner chamber 17, as described below.

Resting surface 12 may be formed with one or more lateral lock stop members 22, against which the folding bicycle lock may abut when placed in bicycle lock carrier 10. Resting surface 12 may be formed with one or more bicycle frame stop members 24, against which the frame of the bicycle may abut when the bicycle lock carrier 10 is secured to the bicycle.

The bicycle lock carrier 10 may be made of a steel alloy or any other sturdy material.

Figure 7:
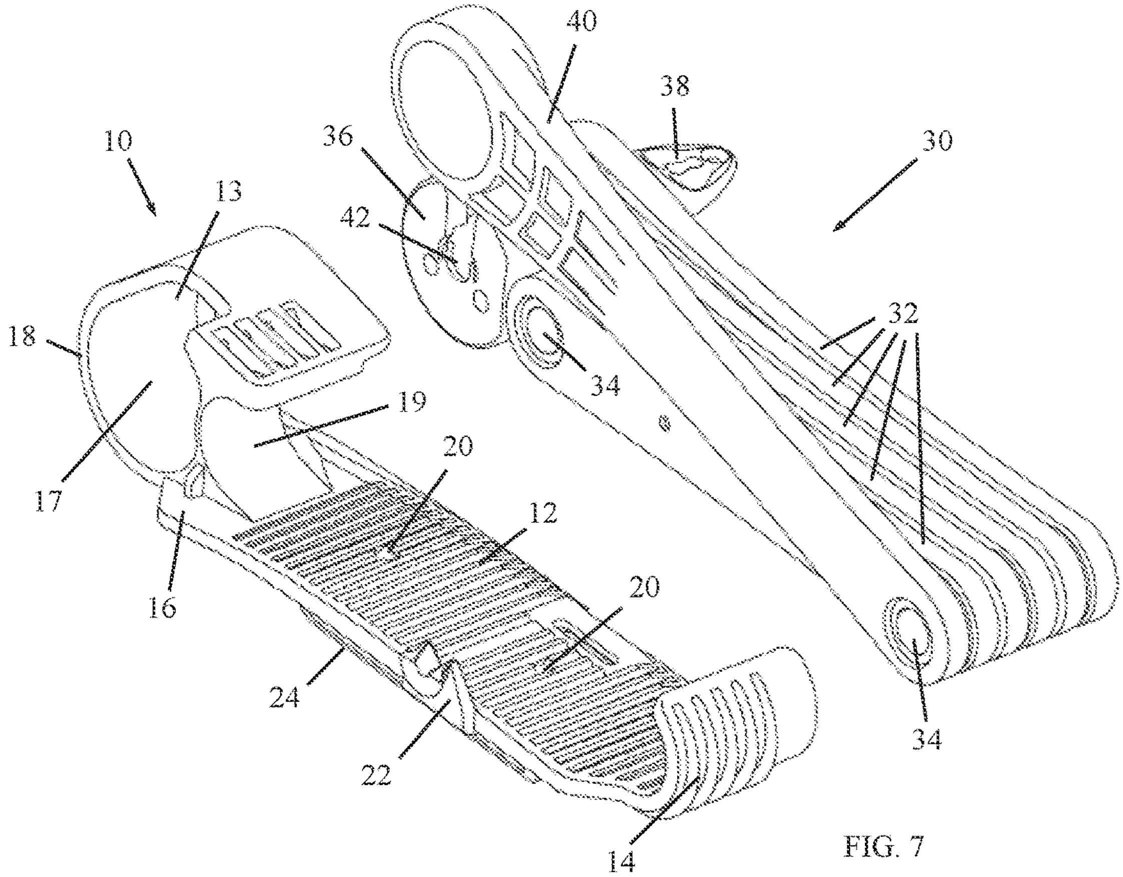
FIG. 7 is a simplified perspective illustration of a folding bicycle lock about to be inserted into the bicycle lock carrier of the invention.

Reference is now made to FIG. 7, which illustrates a folding bicycle lock 30 about to be inserted into the bicycle lock carrier 10. The folding bicycle lock 30 may include a plurality of link members 32, which are pivotally connected to one another by joint members 34, such as rivets or pins.

Link members 32 may be made of a material hardened and dimensioned against cutting or other vandalistic forces (such as a hardened steel alloy or any other suitable material). Link members 32 may be covered with a non-metallic covering, such as a plastic, rubber, silicone or other polymer coating or covering, which is aesthetically pleasing and prevents scraping or scratching the frame of the bicycle.

One of the link members 32 may be connected to a locking device, such as a lock 36, which may be a cylinder lock operated by a key 38 or any other type of lock, such as but not limited to, a combination lock, cylinder lock, wafer lock, or wireless communication lock (that operates with a transponder that communicates with identification circuitry in the lock to gain authorized access to the lock), e.g., an RFID lock, NFC lock, Bluetooth lock, Wi-Fi lock, mobile device, and others. Other locking types can also be used. Another link member 32 is connected to a lockable link member 40, which is typically longer than the rest of the link members 32.

The lock 36 includes a lock member 42 that can engage a locking structure 43 (shown in FIG. 9) of lockable link member 40 so as to lock the lock member 42 to the lock 36. Without limitation, locking structure 43 may be a lug or notch or other structure. Opening the lock 36 releases the lock member 42 to unlock lockable link member 40 from lock 36, so as to permit the user to unfold and stretch out the link members 32.

Figure 8:
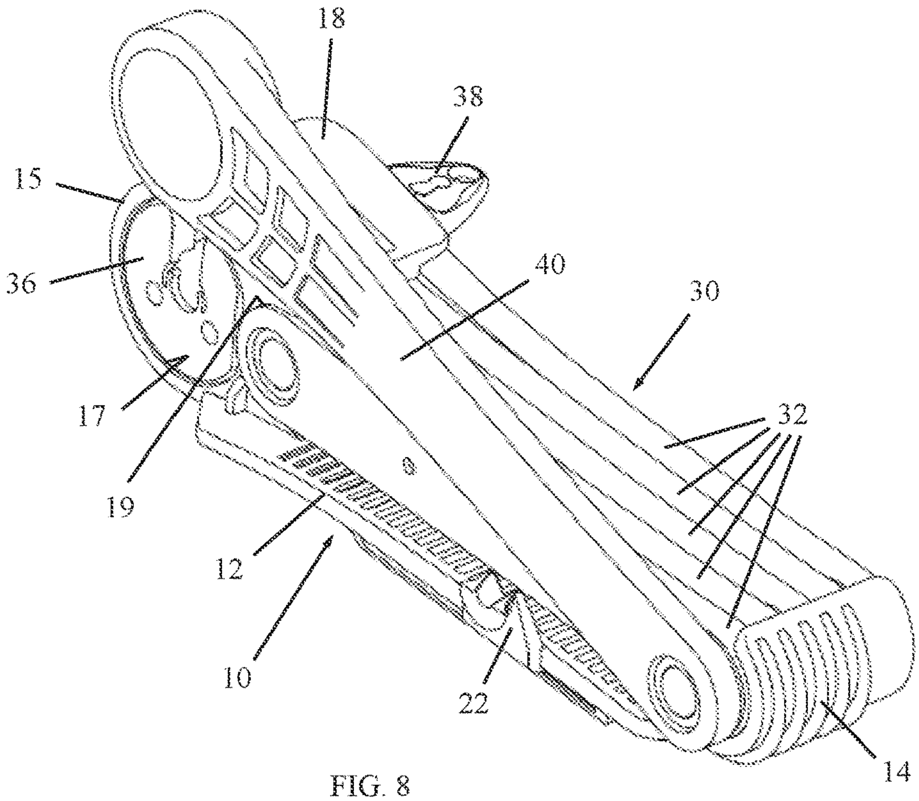
FIG. 8 is a simplified perspective illustration of the folding bicycle lock inserted into the bicycle lock carrier of the invention, and prior to be locked therein.

Reference is now made to FIG. 8, which illustrates folding bicycle lock 30 inserted into the bicycle lock carrier 10, and prior to locking therein. It is seen that the ends of the link members 32 near the lock 36 fit against outer curved abutment 19 and the opposite ends fit against the inner surface of first end 14. The lock 36 sits in inner chamber 17 up to, or close to, end 15 of lock receiving member 18.

Figure 9:
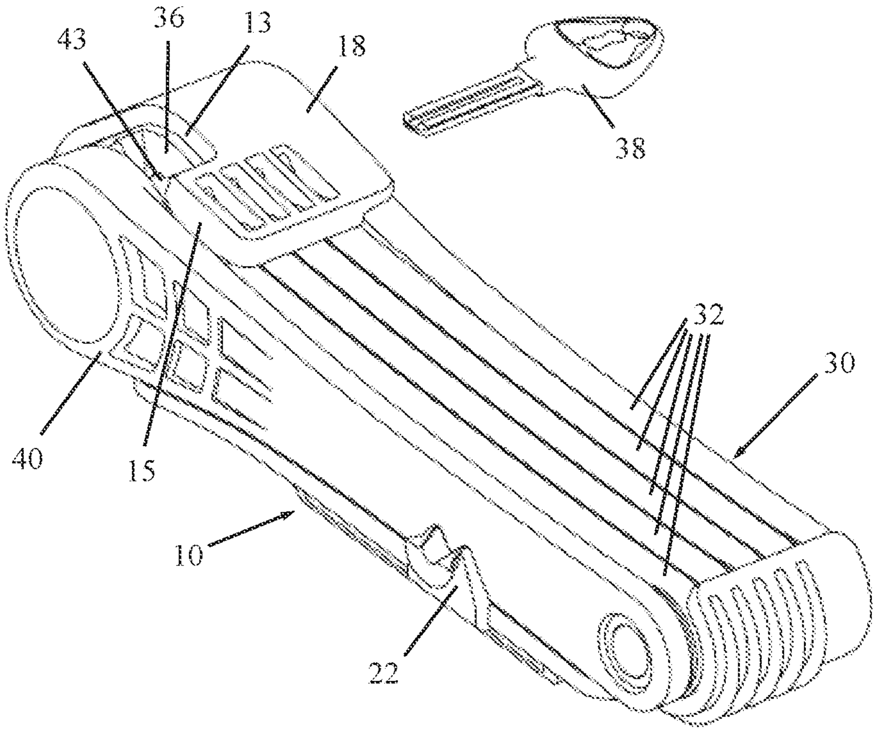
FIG. 9 is a simplified perspective illustration of the folding bicycle lock locked to the bicycle lock carrier of the invention.

In FIG. 9, the end of lockable link member 40, which has the locking structure 43, has been pivoted to align with lock 36 so that lock 36 can lock the locking structure 43, thereby locking the folding bicycle lock 30 to the bicycle lock carrier 10. The lockable link member 40 is positioned against or near the outside of end 15 of lock receiving member 18 and recess 13 allows the locking structure 43 to pass into inner chamber 17. Since lockable link member 40 is on the outside of end 15 of lock receiving member 18 and lock 36 is on the inside of end 15 of lock receiving member 18, folding bicycle lock 30 is now locked to lock receiving member 18 of bicycle lock carrier 10. Only an authorized user with key 38 can now remove folding bicycle lock 30 from bicycle lock carrier 10.

Figure 10:
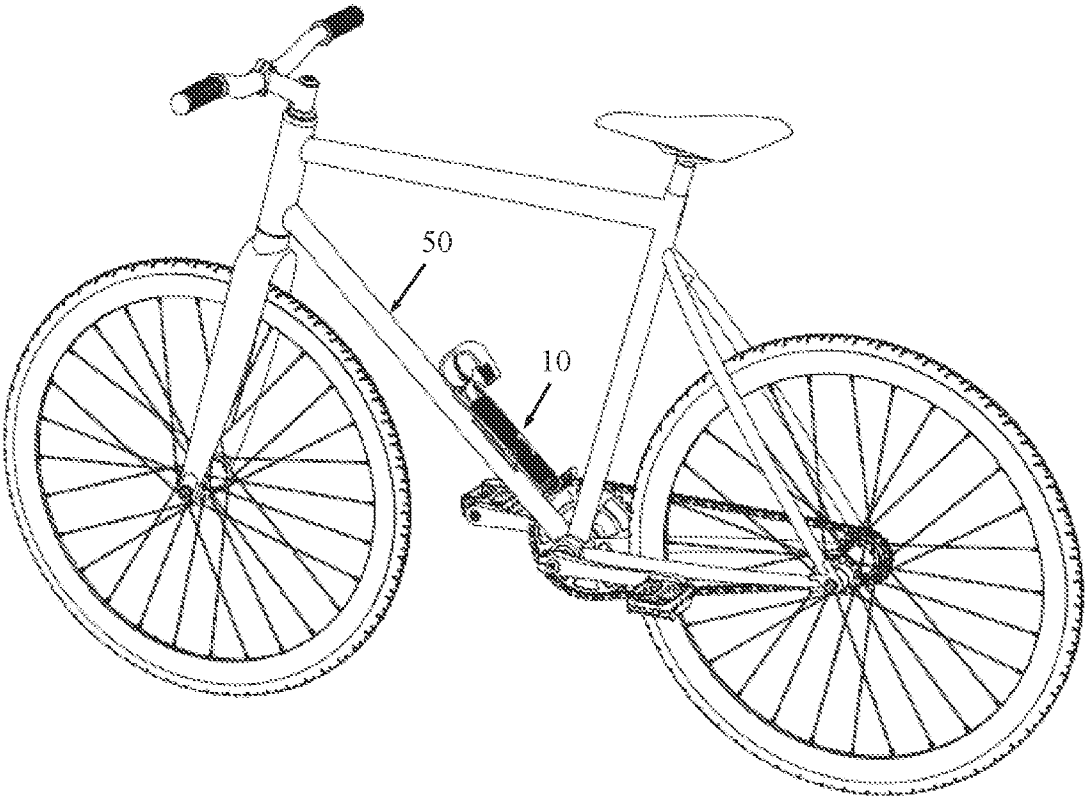
FIGS. 10 and 11 are simplified perspective illustrations of the bicycle lock carrier of the invention secured to a bicycle, respectively before and after locking the folding lock to the carrier.
Figure 11:
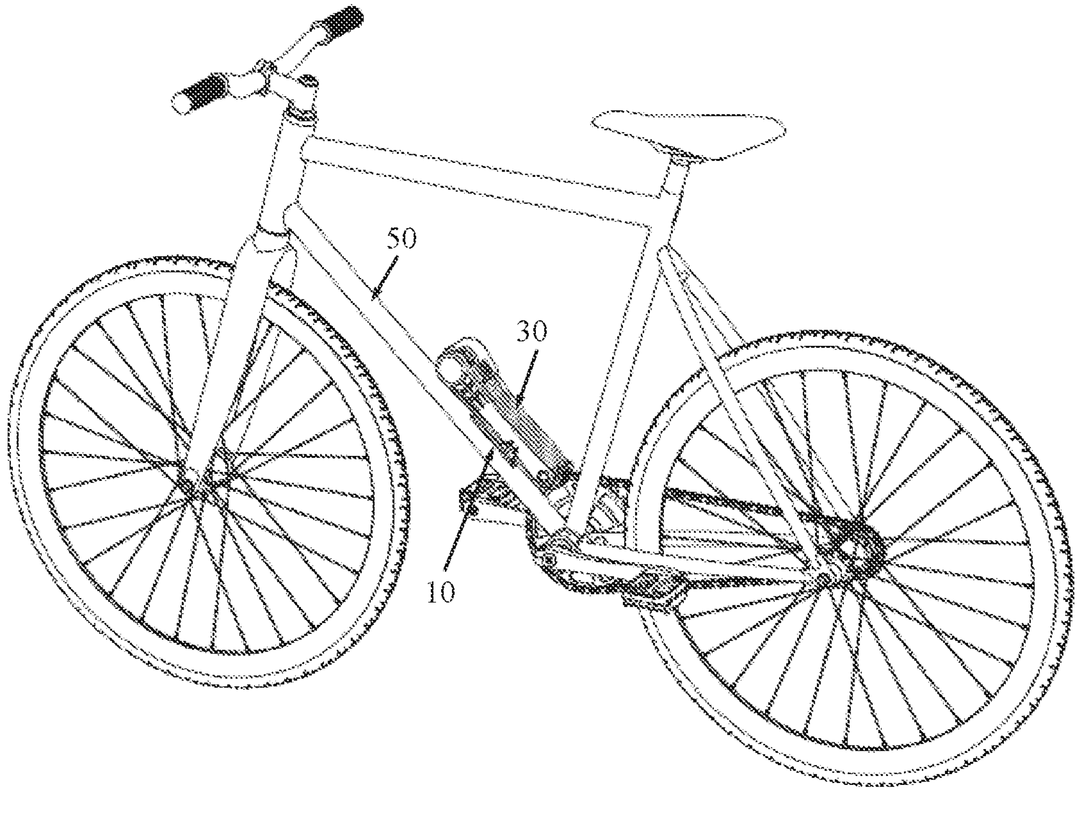

Reference is now made to FIGS. 10 and 11, which illustrate the bicycle lock carrier 10 secured to a bicycle 50, respectively before and after locking the folding lock 30 to the carrier 10. It is noted that any screws used to secure bicycle lock carrier 10 to the frame of bicycle 50 are hidden from view and access by the folding lock 30.

The invention claimed is:

1. A bicycle lock carrier assembly comprising:
   - a bicycle lock carrier comprising a resting surface that comprises a lock receiving member, which comprises a hollow portion bounded by a wall, and one or more mounting provisions for securing to a frame of a bicycle; and
   - a bicycle lock comprising a lock that fits inside said hollow portion of said lock receiving member, said lock comprising a lock member that is arranged to engage a locking structure of a portion of said bicycle lock which is outside said wall of said lock receiving member when said bicycle lock is placed on said resting surface, so as to lock said bicycle lock to said lock receiving member of said bicycle lock carrier.

2. The bicycle lock carrier assembly according to claim 1, wherein said bicycle lock comprises a folding bicycle lock that comprises a plurality of link members which are pivotally connected to one another by joint members, and said locking structure of the portion of said bicycle lock is located on a lockable link member, which is one of said link members.

3. The bicycle lock carrier assembly according to claim 2, wherein an end of said resting surface is curved to correspond to a curvature of said link members of said folding bicycle lock.

4. The bicycle lock carrier assembly according to claim 2, wherein said lock receiving member comprises an outer curved abutment that couples to said resting surface, said outer curved abutment being curved to correspond to a curvature of said link members of said folding bicycle lock.

5. The bicycle lock carrier assembly according to claim 1, wherein said lock receiving member has an inner, hollow, circular chamber for receiving therein said lock of said bicycle lock.

6. The bicycle lock carrier assembly according to claim 1, wherein said resting surface comprises one or more lateral lock stop members.

7. The bicycle lock carrier assembly according to claim 1, wherein said resting surface comprises one or more bicycle frame stop members.

8. The bicycle lock carrier assembly according to claim 1, wherein when said bicycle lock is placed on said resting surface and locked to said lock receiving member, said bicycle lock overlies, and prevents access to, said one or more mounting provisions.

9. A bicycle lock carrier assembly comprising:
   - a bicycle lock carrier comprising a resting surface that comprises a lock receiving member and one or more mounting provisions for securing to a frame of a bicycle; and
   - a bicycle lock comprising a lock that fits inside said lock receiving member, wherein said bicycle lock has a configuration in which said bicycle lock is locked to said bicycle lock carrier and blocks access to said one or more mounting provisions, and wherein said bicycle lock comprises a lock that fits inside said lock receiving member, said lock comprising a lock member that is arranged to engage a locking structure of a portion of said bicycle lock which is outside said lock receiving member when said bicycle lock is placed on said resting surface and overlies said one or more mounting provisions, so as to lock said bicycle lock to said lock receiving member of said bicycle lock carrier.

* * * * *